(12) United States Patent
Russell et al.

(10) Patent No.: US 10,482,498 B2
(45) Date of Patent: Nov. 19, 2019

(54) SYSTEMS AND METHODS FOR A MERCHANT PAYMENT CARD MARKETING LABORATORY

(71) Applicants: Tobias D. Russell, Alexandria, VA (US); Drew Jacobs, Arlington, VA (US); Luke A. Hammock, Washington, DC (US)

(72) Inventors: Tobias D. Russell, Alexandria, VA (US); Drew Jacobs, Arlington, VA (US); Luke A. Hammock, Washington, DC (US)

(73) Assignee: Capital One Services, LLC, McClean, VA (US)

(*) Notice: Subject to any disclaimer, the term of this patent is extended or adjusted under 35 U.S.C. 154(b) by 880 days.

(21) Appl. No.: 14/330,116

(22) Filed: Jul. 14, 2014

(65) Prior Publication Data

US 2015/0019326 A1 Jan. 15, 2015

Related U.S. Application Data

(60) Provisional application No. 61/846,109, filed on Jul. 15, 2013.

(51) Int. Cl.
*G06Q 30/02* (2012.01)
(52) U.S. Cl.
CPC .................. *G06Q 30/0255* (2013.01)
(58) Field of Classification Search
CPC .................................................. G06Q 30/0201
See application file for complete search history.

(56) References Cited

U.S. PATENT DOCUMENTS

| | | | | |
|---|---|---|---|---|
| 2002/0138335 A1* | 9/2002 | Palmer | ............... | G06Q 20/102 705/14.67 |
| 2003/0195793 A1* | 10/2003 | Jain | ............... | G06Q 30/02 705/7.32 |
| 2004/0254837 A1* | 12/2004 | Roshkoff | ............ | G06Q 20/105 705/14.13 |
| 2005/0055275 A1* | 3/2005 | Newman | ............... | G06Q 30/02 705/14.41 |
| 2005/0222906 A1* | 10/2005 | Chen | ............... | G06Q 30/02 705/14.41 |
| 2008/0086369 A1* | 4/2008 | Kiat | ............... | G06Q 30/02 705/14.41 |
| 2009/0187477 A1* | 7/2009 | Bardin | ............... | G06Q 30/0273 705/14.69 |

(Continued)

*Primary Examiner* — Marie P Brady
(74) *Attorney, Agent, or Firm* — Finnegan, Henderson, Farabow, Garrett & Dunner LLP

(57) ABSTRACT

In one embodiment, a system is configured to receive a market analysis request regarding customers having a partnership card account associated with a financial service provider and a merchant. The system may determine one or more online behavior characteristics of the customers and access data associated with financial transactions of the customers from the financial service provider. The system may further determine analysis results responsive to the received market analysis request based on at least the determined one or more online behavior characteristics and the accessed financial transactions of the customers. The system may further generate a report indicating at least the determined analysis results.

20 Claims, 9 Drawing Sheets

(56) References Cited

U.S. PATENT DOCUMENTS

| | | | |
|---|---|---|---|
| 2009/0313109 A1* | 12/2009 | Bous | G06Q 30/02 705/14.31 |
| 2010/0106568 A1* | 4/2010 | Grimes | G06Q 30/02 705/14.1 |
| 2011/0231224 A1* | 9/2011 | Winters | G06Q 30/0201 705/7.29 |
| 2011/0264581 A1* | 10/2011 | Clyne | G06Q 20/10 705/39 |
| 2011/0320250 A1* | 12/2011 | Gemmell | G06Q 30/02 705/14.16 |
| 2012/0004967 A1* | 1/2012 | Satyavolu | G06Q 30/0215 705/14.17 |
| 2013/0036014 A1* | 2/2013 | Bender | G06Q 30/02 705/14.66 |
| 2013/0085804 A1* | 4/2013 | Leff | G06Q 30/0219 705/7.29 |
| 2014/0074550 A1* | 3/2014 | Chourey | G06Q 30/02 705/7.29 |
| 2014/0114746 A1* | 4/2014 | Pani | G06Q 10/067 705/14.45 |

* cited by examiner

MERCHANT TESTING LABORATORY PROCESS 400

*Consumer Information*

In-Store Purchases
*What consumer bought*
- Products bought
- Amount spent
- Frequency of purchase

Marketing Data
*What marketing messages have the consumer has seen?*
- Emails
- Direct mails
- Product promotions
- TV ads
- Etc.

Historical Digital Activity
*What the consumer does online*
- Search
- Site visits
- Email keywords
- Social graph and preference (e.g. Facebook "likes", Twitter followers)
- Media consumption (e.g. TV viewing habits, online / mobile behavior)

Real-time Digital Activity
*What the consumer is doing right now*
- Mobile geolocation patterns
- Real-time purchase activity
- Historical purchase

FIGURE 8

Marketing Laboratory Data Structure

| Customer | Time / Channel | Product / Value Prop | Price / Discount |
|---|---|---|---|
| Customer 1 | Responsive to mailers, buys online | Luxury Blue Cardigan | 100% of Sticker Price |
| Customer 2 | Responsive to in-store adverts, buys in-store | Pink Tank Top | 70% of Sticker Price |
| . . . | . . . | . . . | . . . |
| Customer N | Channel T(N) | Product F(N) | Price C(N) |

FIGURE 9

SYSTEMS AND METHODS FOR A MERCHANT PAYMENT CARD MARKETING LABORATORY

PRIORITY CLAIM

This application claims priority under 35 U.S.C. § 119 to U.S. Provisional Application No. 61/846,109, filed on Jul. 15, 2013, which is expressly incorporated herein by reference in its entirety.

BACKGROUND

Financial service providers, such as credit card companies, banks, and the like, issue financial service products (e.g., credit cards) both under their own brands and in partnership with other entities, such as product manufacturers or retailers (e.g., partnered financial service accounts such as private label credit cards). Merchants, such as retailers, have typically used these partnered financial service accounts to provide a direct marketing connection with their customers and track customer store purchases over time. Despite spending tremendous amounts of money and effort to market their products to consumers, merchants have a very poor understanding of "what works" and "what doesn't work." Moreover, merchants cannot fully understand a particular customer's purchase motivations because they have little or no insight into how that customer behaves beyond the customer's purchase history using the partnered financial service accounts associated with the merchant. This is true at least because merchants typically lack the direct customer access and observational opportunities associated with powerful customer information like the customer's financial situation, personal interests, as well as real-time information such as current location.

There is therefore a need to address these and other issues faced by merchants (and similarly situated entities) who seek to gain a more developed understanding of their marketing efforts influence on their customer's purchases.

SUMMARY

Disclosed embodiments include methods, systems, and computer-readable media configured to, for example, provide a merchant testing laboratory for testing marketing efforts of a merchant on a subset of its entire customer base. The disclosed embodiments may be configured to provide merchants or other entities the ability to perform marketing tests on their partnership/loyalty card customers and link those customer's responses in substantially real-time to key factors such as credit score, income, websites viewed, neighborhood, and the relevant marketing channel. For example, customized marketing campaigns/communications may be sent to a subset of a merchant's customer base (i.e., its partnership card customers) and the responses to those marketing communications may be monitored and analyzed by the provider of the testing laboratory (such as the financial service provider associated with the merchant partnership card) using factors not typically available to the merchant. The testing laboratory provider may then provide the results of the marketing campaign tests to the merchants with insights into what demographic groups responded most positively to which marketing campaigns. The merchant may subsequently use the results of the marketing campaign to, for example, launch targeting marketing campaigns within its larger consumer base.

In one aspect, the disclosed embodiments include a method for providing a merchant testing laboratory. The method may include receiving a market analysis request for customers having a partnership card account associated with a financial service provider and a merchant. The method may also include determining, using at least one processor, one or more online behavior characteristics of the customers and accessing data associated with financial transactions of the customers from the financial service provider. The method may further include determining, using the at least one processor, analysis results responsive to the received market analysis request based on at least the determined one or more online behavior characteristics and the accessed financial transactions of the customers, and generating, using the at least one processor, a report indicating at least the determined analysis results.

The disclosed embodiments may also include a device for providing a merchant testing laboratory. The device may include a memory storing software instructions, the software instructions including an application configured to perform marketing analysis processes. The device may also include one or more processors configured to execute the software instructions to receive a market analysis request for customers having a partnership card account associated with a financial service provider and a merchant. The one or more processors may be further configured to determine one or more online behavior characteristics of the customers and access data associated with financial transactions of the customers from the financial service provider. The one or more processors may also be configured to determine analysis results responsive to the received market analysis request based on at least the determined one or more online behavior characteristics and the accessed financial transactions of the customers. Finally, the one or more processors may be configured to generate a report indicating at least the determined analysis results.

The disclosed embodiments include systems that perform operations consistent with the functionalities exemplified above from the perspective of a financial service provider system, manufacturer system, consumer mobile device, or other third-party systems distinct from the financial service provider, merchant, and consumer.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 8 is a diagram of exemplary consumer information, consistent with disclosed embodiments.

FIG. 9 is a diagram of an exemplary data structure for storing information associated with a merchant testing laboratory, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
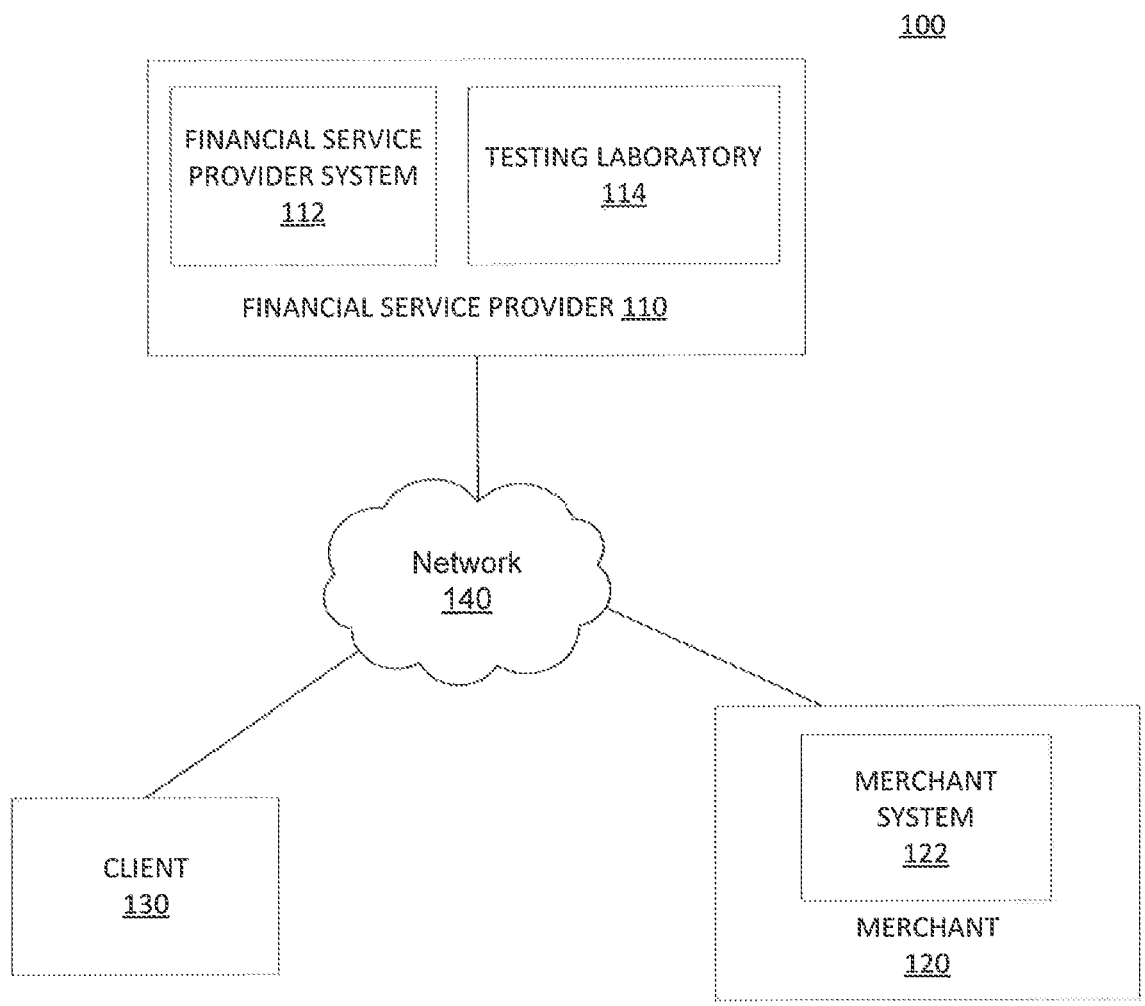
FIG. 1 is a block diagram of an exemplary system, consistent with disclosed embodiments.

FIG. 1 is a block diagram of an exemplary system 100 for performing one or more operations consistent with the disclosed embodiments, in one embodiment, system 100 may include one or more financial service providers 110, one or more merchants 120, one or more clients 130, and network 140. The components and arrangement of the components included in system 100 may vary. Thus, system 100 may include other components that perform or assist in the performance of one or more processes consistent with the disclosed embodiments.

Components of system 100 may be computing systems configured to provide a merchant payment card marketing laboratory, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with financial service provider 110, merchant 120, and/or client 130. In certain aspects, users may operate one or more components of system 100 to initiate and provide input for one or more operations consistent with the disclosed embodiments.

Financial service provider 110 may be an entity that provides, maintains, manages, or otherwise offers financial services. For example, financial service provider 110 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like. Consistent with certain disclosed embodiments, financial service provider 110, using financial service provider system 112, may provide manufacturer-based financial service accounts, which may be financial service accounts that are associated with a manufacturer of products or services, such as a product manufacturer 120. For example, financial service provider 110 may provide financial services for a credit card account that is branded by an entity, such as a private label credit card branded by a product manufacturer.

Financial service provider 110 may include one or more financial service provider systems 112. In one aspect, financial service provider system 112 may be one or more computing devices configured to perform one or more operations consistent with disclosed embodiments. In one aspect, financial service provider system 112 may be a desktop computer, a server, or any other type of computing device. Financial service provider system 112 may include one or more processors configured to execute software instructions stored in memory. The one or more processors may be configured to execute software instructions that when executed by a processor performs known Internet-related communication and financial service-based processes. For instance, financial service provider system 112 may execute software that provides data used for generating and displaying interfaces, including content on a display device included in, or connected to, client 130. In some embodiments, financial service provider 110 may provide one or more web sites or online portals that are accessible by client 130 and/or merchant 120 over network 140. The disclosed embodiments are not limited to any particular configuration of financial service provider system 112.

Financial service provider 110 may include one or more testing laboratories 114. In one aspect, testing laboratories 114 may be one or more computing devices configured to perform one or more operations consistent with disclosed embodiments. For example, testing laboratories 114 may be a desktop computer, a server, or any other type of computing device. Testing laboratories 114 may include one or more processors configured to execute software instructions stored in memory. The one or more processors may be configured to execute software instructions that when executed by the one or more processors perform known Internet-related communication, database management, financial service-based processes, and/or marketing campaign functions. For instance, testing laboratories 114 may execute software that provides data used for generating and displaying interfaces, including content on a display device included in, or connected to, client 130 or merchant system 122. The disclosed embodiments are not limited to any particular configuration of testing laboratories 114.

Merchant 120 may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities, such as user 152) may purchase, consume, use, etc. Merchant 120 may offer for sale one or more products of product manufacturer 120. In one example, merchant 120 may be associated with merchant brick and mortar location(s) that a consumer (e.g., a user of client 130) may physically visit and purchase a product or service. Merchant 120 may also include back- and/or front-end computing components that store data and execute software instructions to perform operations consistent with disclosed embodiments, such as computers that are operated by employees of the merchant (e.g., back office systems, etc.).

Merchant 120 may include merchant system 122 and one or more Point-of-Sale (POS) systems 144. Merchant system 122 may include one or more computing systems, such as server(s), desktop computers, etc., that are configured to execute stored software instructions to perform operations associated with a merchant, including one or more processes associated with processing purchase transactions, generating transaction data, generating product data (e.g., SKU data) relating to purchase transactions, etc. Merchant system 122 may perform one or more operations consistent with the disclosed embodiments. The disclosed embodiments are not limited to any particular configuration of merchant system 122.

Client 130 may be one or more computing devices configured to perform one or more operations consistent with disclosed embodiments. Client 130 may be a desktop computer, a laptop, a server, a mobile device (e.g., tablet, smart phone, etc.), or any other type of computing device. For exemplary purposes, aspects of the disclosed embodiments are described with reference to client 130 as a mobile client device, such as a smart phone, tablet, or the like. As mentioned herein, however, the disclosed embodiments are not limited to such examples.

Client 130 may include one or more processors configured to execute software instructions stored in memory, such as memory included in client 130. Client 130 may include software that when executed by a processor performs known Internet-related communication, content display processes, and financial service-related processes for a user of client 130. For instance, client 130 may execute browser or related mobile display software that generates and displays interfaces including content on a display device included in, or in communication with, client 130. Client 130 may be a mobile device that executes mobile device applications and/or mobile device communication software that allows client 130 to communicate with components over network 140, and generates and displays content in interfaces via a display device included in client 130. The disclosed embodiments are not limited to any particular configuration of client 130. For instance, client 130 may be a mobile device that stores and executes mobile applications that provide financial service-related functions offered by financial service provider system 112 and/or product manufacturer system 122, such as a mobile banking application associated with a private label financial service account for checking balances, paying bills, performing financial transactions, receiving marketing messages, etc. In certain embodiments, client 130 may be configured to execute software instructions relating to location services, such as GPS locations. For example, client 130 may be configured to determine a geographic location of client 130 (and associated user) and provide location data and time stamp data corresponding to the location data.

In one embodiment, merchant 120 may interface with testing laboratory 114 (via, e.g., merchant system 122) to perform one or more operations consistent with the disclosed embodiments. In one aspect, merchant 120 may operate or otherwise communicate with testing laboratory 114 via a website, API resource, etc. For instance, financial service provider 110 may maintain a merchant marketing testing account for merchant 120 that the merchant may use to perform market testing according to disclosed embodiments. In other embodiments, the merchant may be a potential customer of financial service provider 110 (such as, e.g., a partner to a private label financial service account offering to consumers) or may not be affiliated with such a financial service provider from the merchant's perspective and/or the financial service provider's perspective.

Network 140 may be any type of network configured to provide communications between components of system 100. For example, network 140 may be any type of network (including infrastructure) that provides communications, exchanges information, and/or facilitates the exchange of information, such as the Internet, a Local Area Network, NFC, Optical code scanner, or other suitable connection(s) that enables the sending and receiving of information between the components of system 100. In other embodiments, one or more components of system 100 may communicate directly through a dedicated communication link(s), such as links between financial service provider 110, merchant 120, and client 130.

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 112 and product merchant system 122 may constitute a part of components of system 100 other than those specifically described, or may constitute a part of multiple components of system 100 (i.e., a distributed system). Moreover, testing laboratory 114 may be separate and distinct from financial service provider 110 and be operated by, for example, a third-party having access to customer specific information. For example, in one aspect, testing laboratory 114 may be operated by a marketing agency who has partnered with parties (such as financial service providers, merchants, social networks, etc.) having access to data reflecting particular persons' financial situation, purchase transaction data, personal interests, marital status, etc. Such alternatives fall within the scope and spirit of the disclosed embodiments.

Figure 2:
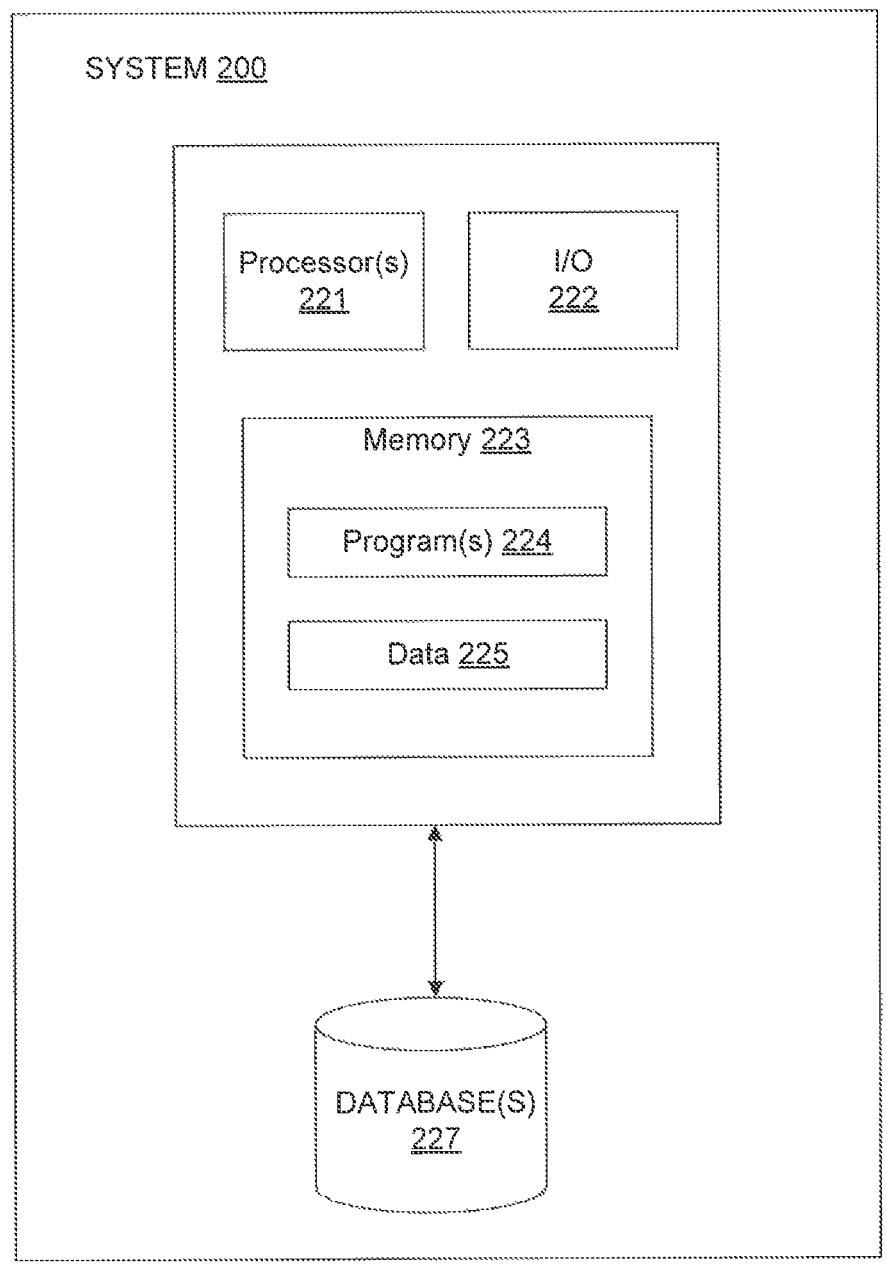
FIG. 2 is a diagram of another exemplary system, consistent with disclosed embodiments.

FIG. 2 shows an exemplary system 200 consistent with disclosed embodiments. Variations of exemplary system 200 may be used by financial service provider 110, merchant 120, and/or client 130. In one embodiment, system 200 may comprise one or more processors 221, one or more input/output (I/O) devices 222, and one or more memories 223. In some embodiments, system 200 may take the form of a server, general purpose computer, mainframe computer, or any combination of these components. In some embodiments, system 200 may take the form of a mobile computing device such as a smartphone, tablet, laptop computer, or any combination of these components. Alternatively, system 200 may be configured as a particular apparatus, embedded system, dedicated circuit, and the like based on the storage, execution, and/or implementation of the software instructions that perform one or more operations consistent with the disclosed embodiments.

Processor 221 may include one or more known processing devices, such as mobile device microprocessors or any various other processors. The disclosed embodiments are not limited to any type of processor(s) configured in system 200.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the client 130, or program 224 may comprise multiple programs. Memory 223 may also store data 225 that is used by one or more programs 312.

In certain embodiments, memory 223 may store a payment card marketing laboratory software that may be executed by processor(s) 221 to perform one or more marketing communication and/or analysis processes consistent with disclosed embodiments. For example, the payment card marketing laboratory software may be run by a financial service provider system 112 or another system associated with a financial service provider 110 that has partnered with merchant 120 to provide a private label financial account held by a consumer.

I/O devices 222 may be one or more devices configured to allow data to be received and/or transmitted by system 200. I/O devices 222 may include one or more digital and/or analog devices that allow system 200 to communicate with other machines and devices, such as other components of system 100. For example, I/O devices 222 may include a screen for displaying marketing messages, financing options, or providing other information to the user, such as a consumer of merchant 120. In other embodiments, I/O devices 222 may include a screen for displaying an interface of testing laboratory 114 to merchant 120. I/O devices 222 may also include one or more digital and/or analog devices that allow a user to interact with system 200 such as a touch-sensitive area, keyboard, buttons, or microphones. I/O devices 304 may also include other components known in the art for interacting with a user.

The components of system 200 may be implemented in hardware, software, or a combination of both hardware and software, as will be apparent to those skilled in the art. For example, although one or more components of system 200 may be implemented as computer processing instructions, all or a portion of the functionality of system 200 may be implemented instead in dedicated electronics hardware.

System 200 may also be communicatively connected to one or more database(s) 227. System 200 may be communicatively connected to database(s) 227 through network 140. Database 227 may include one or more memory devices that store information and are accessed and/or managed through system 200. By way of example, database(s) 227 may include Oracle™ databases, Sybase™ databases, or other relational databases or non-relational databases, such as Hadoop sequence files, HBase, or Cassandra. The databases or other files may include, for example, data and information related to the financial records, purchase transaction data, consumer demographics information, etc. Systems and methods of disclosed embodiments, however, are not limited to separate databases. In one aspect, system 200 may include database 227. Alternatively, database 227 may be located remotely from the system 200. Database 227 may include computing components (e.g., database management system, database server, etc.) configured to receive and process requests for data stored in memory devices of database(s) 227 and to provide data from database 227.

Figure 3:
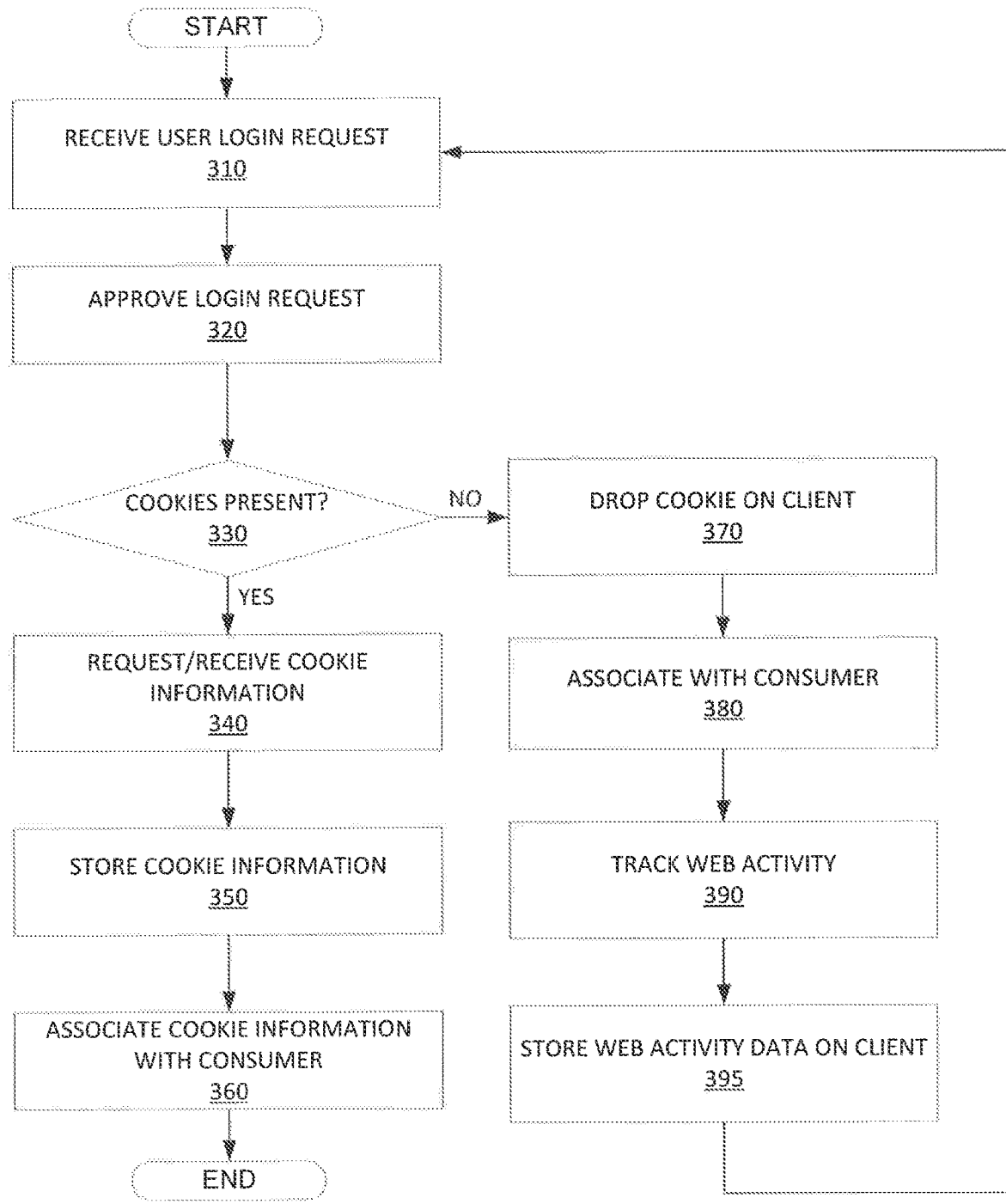
FIG. 3 is a flow chart of an exemplary consumer information collection process, consistent with disclosed embodiments.

FIG. 3 shows a flowchart of an exemplary consumer information collection process 300, consistent with disclosed embodiments. According to some embodiments, collected information regarding a customer's online activity including internet searches, web pages visited, advertising clicks, social media activity, media viewing consumption, online behavior, and the like may be used by, for example, testing laboratory 114 to identify customer preferences and other contextual information useful for analyzing merchant marketing efforts.

In step 310, financial service provider system 112 may receive a customer login request (via, e.g., client 130) to log into an account of the customer. For example, the customer may request online access to a partnered financial service account associated with financial service provider 110 and merchant 120. Financial service provider system 112 may authorize access of the customer based on the login credentials presented (step 320) using any variety of online account access verification procedures known in the art. At step 330, financial service provider system 112 may determine whether a cookie (commonly referred to as an HTTP cookie, web cookie, browser cookie, and the like) associated with financial service provider 110 is present on client device 130.

If a cookie is not detected on client device 130 (step 330; NO), financial service provider system 112 may transmit a cookie to client device 130 (step 370). According to some embodiments, the transmitted cookie may include a tracking number or other identification method allowing financial service provider system 112 to uniquely recognize the transmitted cookie. Financial service provider system 112 may also associate the transmitted cookie with the customer by, for example, associating the cookie tracking number with the customer's accessed partnered financial service account (step 380). The transmitted cookie may compile a record of the customer's online activity following its storage on client 130 (step 390), including internet searches, web pages visited, advertising clicks, social media activity (Facebook™ "likes," Twitter™ followings, etc.), media viewing consumption (observed videos, online news articles, etc.) online behavior (amount of time spent online, types of activities engaged, etc.), and the like. The record of the customer's online activity may be stored, for example, in the transmitted cookie on client device 130 (step 395). Additionally or alternatively, partners of financial service provider 100 (including, for example, merchant 120 associated with the partnered financial service account of the customer) may store cookies on client 130 when the customer visits a website associated with merchant 120.

If a cookie associated with financial service provider 110 (or partner of financial service provider 110) is detected on client device 130 (step 330; YES), financial service provider 112 may request or otherwise receive the cookie and data associated with the cookie indicating the consumer's online activity (step 340). Additionally or alternatively, financial service provider system 112 may receive cookie data from one or more partners of financial service provider 100 (including, for example, merchant 120 associated with the partnered financial service account of the customer) that the partner(s) retrieved from client 130 when the customer visited a website associated with merchant 120. In step 350, financial service provider system 112 may store the cookie data in a memory device (such as, for example, database 227) (step 350). Financial service provider system 112 may also associate the cookie data with the consumer by, for example, associating the stored cookie data with the consumer's partnered financial service account information (step 360).

In alternative embodiments, data reflecting the customer's online activity may be periodically requested or otherwise provided to financial service account provider system 112 without the customer logging into the customer's partnered financial service account.

One of ordinary skill in the art would understand that any method of tracking online activity may be implemented by the disclosed embodiments to identify customers' online behavior. For example, tracking technologies that do not rely on HTTP cookies may be implemented by disclosed embodiments, such as so-called "supercookies."

Figure 4:
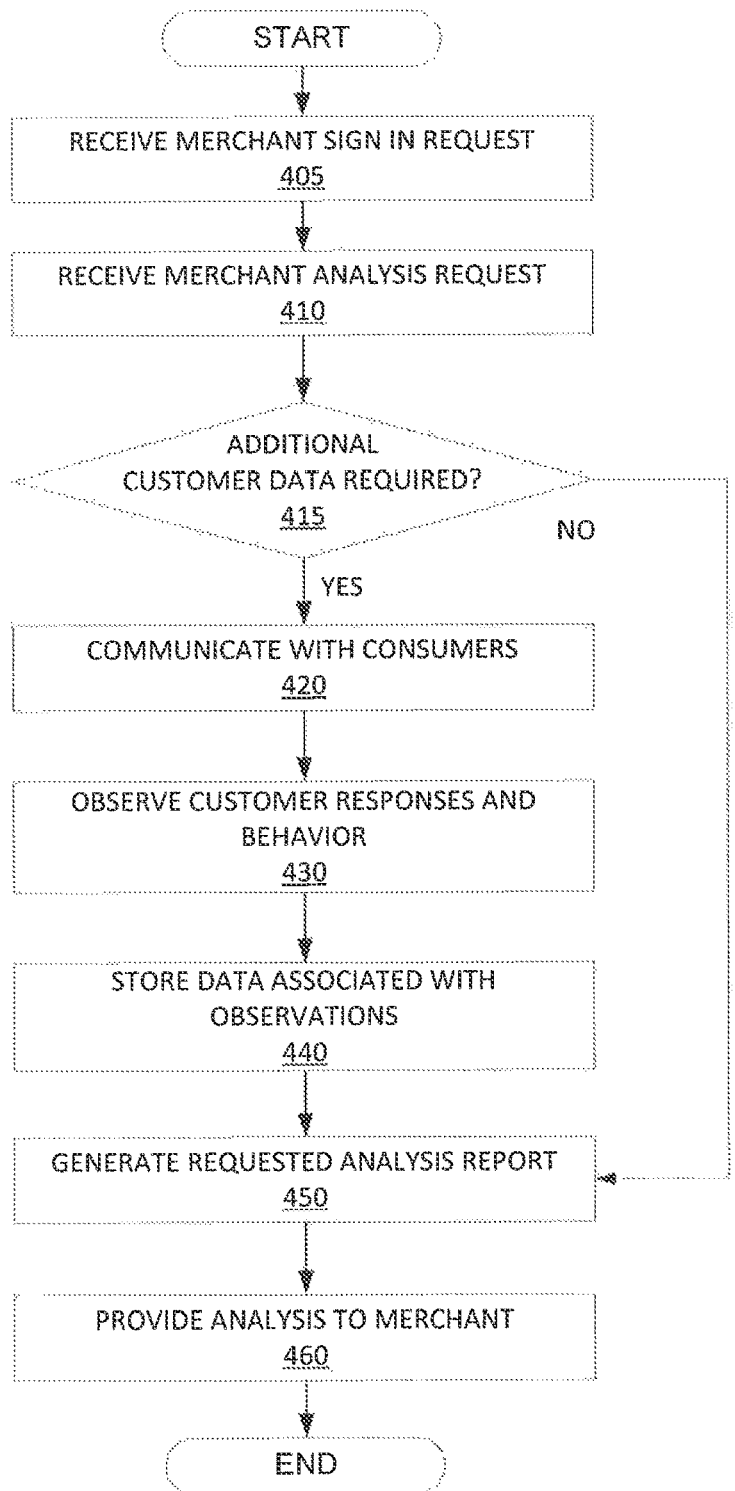
FIG. 4 is a flow chart of an exemplary merchant testing laboratory process, consistent with disclosed embodiments.

FIG. 4 shows an exemplary merchant testing laboratory process 400, consistent with disclosed embodiments. According to some embodiments, a merchant who has partnered with financial service provider 110 to provide its customers with partnered financial service account may have access to testing laboratory 114. For example, merchant 130 may have a laboratory testing account allowing a user associated with merchant 130 to access functions associated with testing laboratory 114, including mechanisms for communicating with its customers with partnered financial service account, initiating marketing campaign tests among its customers with partnered financial service account, and/or accessing a measurement platform of testing laboratory 114 capable of analyzing responses to marketing campaign tests, demographic information, customer online activity data, customer financial transaction data, etc.

Figure 7:
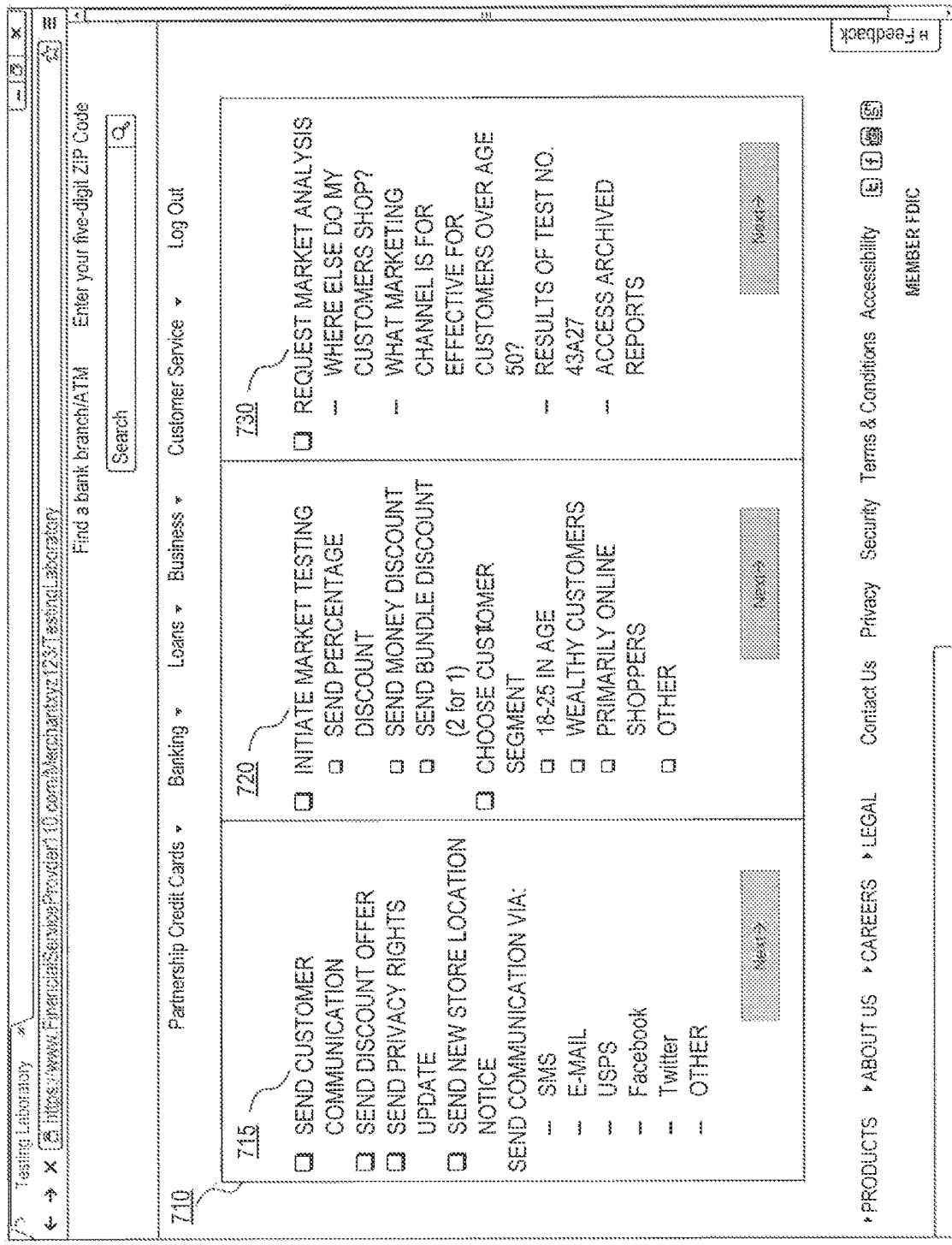
FIG. 7 is a diagram of an exemplary interface displaying a merchant testing laboratory, consistent with disclosed embodiments.

At step 405, testing laboratory 114 may receive a login request from merchant 120 (via, e.g., merchant system 122). Upon a successful login, testing laboratory 144 may provide an interface to merchant 120 displayed by merchant system 122 that includes, for example, graphical images of available testing laboratory 114 services associated with the merchant 120 account. An exemplary interface associated with testing laboratory 114 is shown at FIG. 7. Testing laboratory interface 710 may include area 715 for a mechanism for communication with customers with a partnered financial service account. According to some embodiments, merchant 120 may send a communication to a subset or all customers having a partnered financial service account via, among other means, postal mail, short messaging service (SMS), text message, e-mail, or an app associated with partnered financial service account, financial service provider 110, and/or merchant 130. Area 715 may further include allow merchant 130 to customize message content, including particular discount offers, store updates, or other information. Interface 710 may further include area 720 for initiating a marketing test. For example, merchant 130 may identify the type of marketing offer (percentage discount, money discount, "2 for 1" deal, etc.), the customer base (aged 18-25, credit scores above 750, wealthy, online shoppers, etc.).

Consistent with disclosed embodiments, merchant 130 may use area 715 to initiate a test marketing campaign among its customers with a partnered financial service account to determine which demographic group responds most positively to a particular channel of advertising. Merchant 130 may then, in turn, use the information learned from the market test to improve its marketing strategy towards its entire customer base. Interface 710 may include area 730 for requesting a testing laboratory analysis. For example, merchant 130 may request the analysis results associated with a particular marketing test previously requested through area 720. Merchant 130 may also request marketing analysis based on collected data associated with customers of merchant 130, such as responses to marketing communications, demographic information, customer online activity data, customer purchase transaction data, etc. According to some embodiments, merchant 130 may request, via area 730, a list of the top three stores most frequently visited by the customer other than merchant 130, the most effective marketing channel (e-mail, print ads, etc.) for male customers over the age of fifty, and the like.

One of ordinary skill in the art would understand that any method of providing interface 710 may be implemented by the disclosed embodiments to identify customers' online behavior. For example, interface 710 may be provided by testing laboratory 114 via a website, API reference, or any other online resource suitable for exchanging information.

Returning to FIG. 4, at step 410, testing laboratory 114 may receive an analysis request from merchant 130. For example, merchant 130 may request a report regarding how customers over a particular age (e.g., customers over thirty years of age) respond to one or more discount offer types (e.g., percentage discount, monetary discount, "2 for 1" deals, etc.), which demographic segment responds most positively to postal mail advertisements, and the like. In another example, merchant 130 may request a report regarding the impact of a certain number of prior marketing campaigns according to specific customer segments. In yet another example, merchant 130 may have excess newspaper inserts marketing offers and request a report indicating which market segment has best responded to newspaper inserts in the past. In yet another example, merchant 130 may request a report showing where the merchant's customers shop most often outside of merchant 130. At step 415, testing laboratory 114 may determine whether the received analysis request may be fulfilled based on existing customer data accessible to testing laboratory 114. For example, if testing laboratory 114 receives an analysis request to determine which market segments is most responsive to as yet unsent 10% off discount offer for a particular hair care product, the request cannot be fulfilled based on existing customer data. In another example, the analysis request may involve sending a discount offer to customers through three different advertising channels in order to observe which advertising channel will result in the most acceptances of the offer. On the other hand, if the testing laboratory 114 receives an analysis request for the average account balance of its customers for a particular time range (e.g., the years 2008-2012), such a request may be fulfilled based on existing customer data accessible to testing laboratory 114. If testing laboratory 114 determines that additional customer data is required to respond to the analysis request (step 415; YES), testing laboratory 114 may send a communication to customers (step 420). For example, continuing the above example, testing laboratory 114 may send a discount offer of 10% off a particular hair care product to all partnership card customers.

At step 430, testing laboratory 114 may observe or otherwise collect information regarding the customer responses and behavior in response to the communication. For example, testing laboratory 114 may receive an indication that the customer has accepted the discount offer by purchasing the product, for example, by facilitating the purchase through an in-app purchase, accessing purchase transaction records indicating the customer purchased the product, receiving a communication from merchant 110 that a customer has used the discount offer, or the like. In some aspects, other information, such as the customer's online activity after receipt of the discount offer, may be considered responsive to a marketing offer. For example, testing laboratory 114 may determine based on cookie information (see FIG. 3; steps 340-360) and purchase transaction information associated with the customers stored in memory associated with financial service provider 110 that, after the receipt of the discount offer from testing laboratory 114, the customer conducted internet searches for related products and/or purchased the same or a similar product from another merchant.

At step 440, testing laboratory 114 may store the data associated with observed customer responses and behavior in memory (such as, e.g., database(s) 227). According to some embodiments, testing laboratory 114 may also request or otherwise receive purchase transaction data and other financial records associated with customers having a partnership card account from financial service provider system 112. In other embodiments, testing laboratory 114 may have direct access to memory of financial service provider system 112 storing purchase transaction data and other financial records of the customers having a partnership card account. A non-limiting example of a data structure for storing customer information testing laboratory 114 is shown in FIG. 9.

Testing laboratory 114 may generate a report reflecting the requested analysis results (step 450). According to some embodiments, the requested analysis reports may be generated in real-time or substantially real-time. For example, testing laboratory 114 may determine that a majority of customers who responded to a recent V-neck shirt marketing communication shared a common characteristic, such as being a student. In another example, testing laboratory 114 may determine that a particular customer group spends at least 5% of their monthly net income on fine dining. In yet another example, testing laboratory 114 may determine that a 15% offer resulted in more offer acceptances among wealthy clients but a "2 for 1" offer on the same product resulted in more offer acceptances from customers making less than $45,000 annually.

Testing laboratory may generate the report reflecting the requested analysis results based on various sources of information, including at least financial data stored by financial service provider 110 associated with partnership card customers (including financial accounts of the customer other than the partnership card account), cookie information reflecting the online actions of the customer (see FIG. 3; steps 340-360), data associated with the customers received from merchant 130, data associated with the customers received from third-parties, customer communications associated with marketing efforts of merchant 110, demographic information, etc. A non-exhaustive list of factors and data that testing laboratory 114 may incorporate in generating the analysis report is depicted in FIG. 8. Finally, at step 460, testing laboratory 114 may provide the analysis results to merchant 130.

Figure 5:
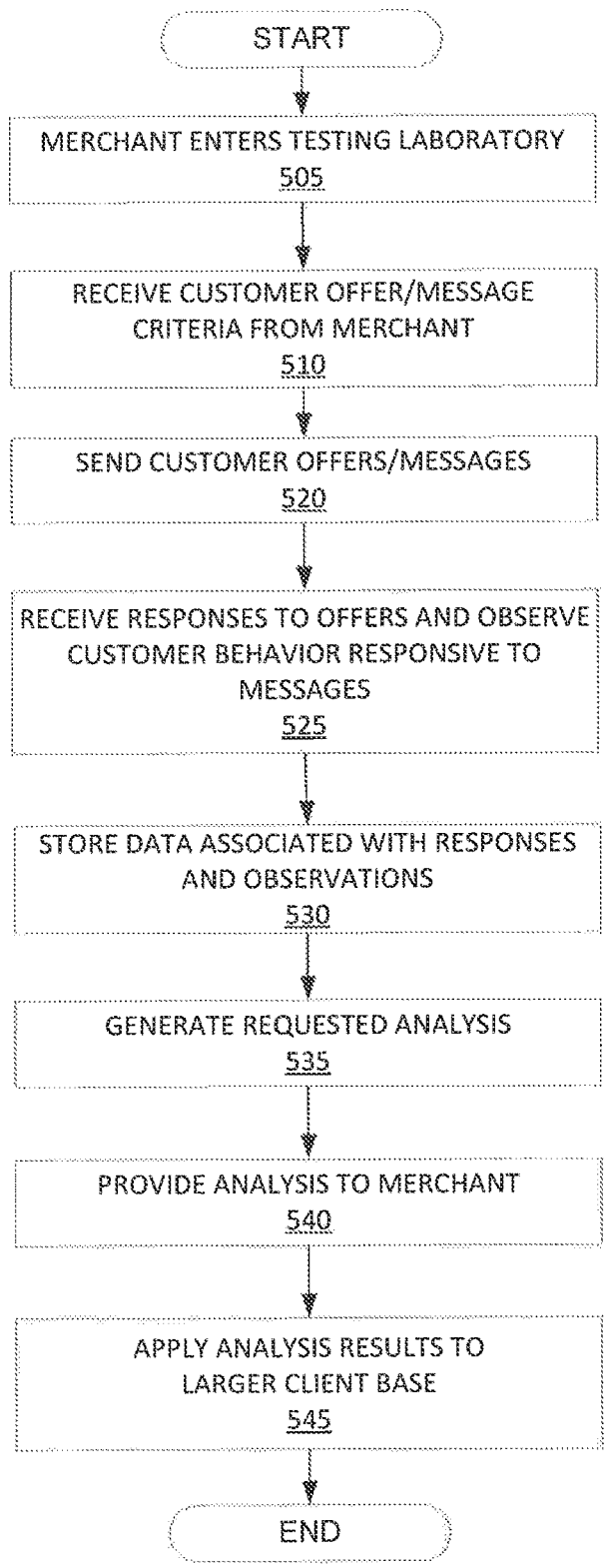
FIG. 5 is a flow chart of an exemplary merchant analysis request process, consistent with disclosed embodiments.

FIG. 5 shows an exemplary merchant analysis request process 500, consistent with disclosed embodiments. At step 505, merchant 130 may enter testing laboratory 114 via an appropriate interface (via, e.g., a website or API resource login or the like.). An exemplary interface associated with testing laboratory 114 is shown at FIG. 7 and discussed above. At step 510, testing laboratory 114 may receive criteria from merchant 130 for a merchant communication and/or marketing offer to send to some or all of partnered financial service account customers (step 510). For example, merchant 130 may send customize message content, particular discount offers, store updates, or other information to partnered financial service account customers, including subsets of those customers according to various distinguishing criteria discussed above. Testing laboratory 114 may further send the customize message content, particular discount offers, store updates, or other information to the specified customers via a variety of communication mechanism known to those of skill in the art including, for example, e-mail, SMS messaging, in-app communication, telephone message, postal mail, etc.). At step 525, testing laboratory 114 may receive or otherwise observe the conduct one or more of the customers. For example, testing laboratory 114 may determine or otherwise receive information indicating that users responded positively to the offer/communication of step 520 by, for example, determining via transaction data stored by financial service provider 110 and associated with the customer reflects the customer purchased the merchant product relevant to the offer/communication, "liked" the merchant and/or merchant product on a social media site, clicked on a purchasing link associated with the communication/offer, or the like. At step 530, testing laboratory 114 may store or secure access to data associated with customers' responses to the communication/offer as discussed in connection with FIG. 9. Testing laboratory 114 may further generate the requested analysis (step 535) and provide the generated analysis to merchant 130 (step 540) in a manner similar to steps 450 and 460, discussed above. Finally, merchant 130 may apply a better understand of the marketing efforts indicated in the provided analysis to a larger customer base, including customers who are not using partnered financial service accounts.

Figure 6:
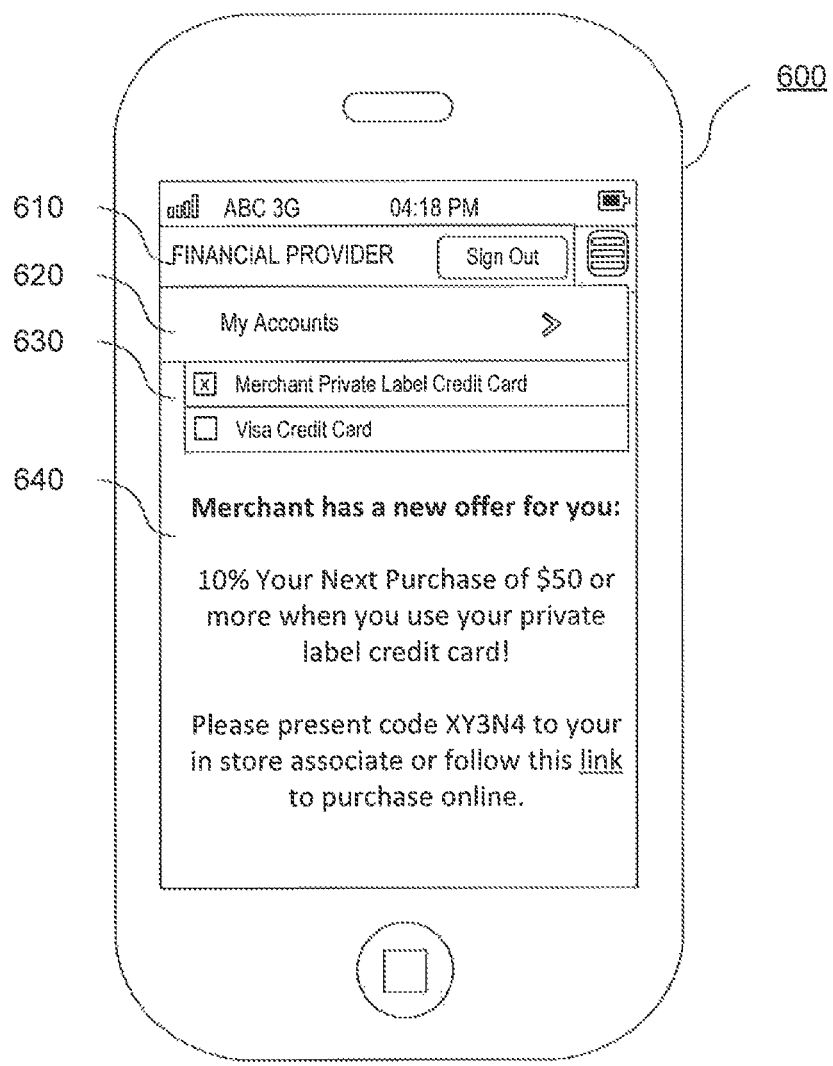
FIG. 6 is a diagram of an exemplary interface displaying a merchant marketing message, consistent with disclosed embodiments.

FIG. 6 is a diagram of an exemplary client 600 including an interface displaying marketing messages consistent with disclosed embodiments. For example, client 600 may include an interface (via, e.g., an app associated with financial service provider 110) that includes a graphical image identifying, for example, the provider of the customer's financial accounts (area 610), a listing of the customer's accounts with the financial service provider (area 620), and an area to select and access features associated with a particular customer account (area 630). Client 610 may also include a message viewing area 640.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A computer-implemented method, comprising:
   providing, from a testing laboratory device and to a merchant device associated with a first merchant, data to display at a display of the merchant device a graphical user interface comprising:
      a first area configured to receive a selection of a type of marketing channel and customizable message content, the customizable message content listing a product; and
      a second area configured to receive a selection of a type of marketing offer and a customer segment;
   receiving, by the testing laboratory device, a market analysis request from the merchant device comprising identifications of a type of marketing channel, customizable message content, a type of marketing offer, and a customer segment, the identifications being based on at least one selection received by the first area and at least one selection received by the second area;
   determining that the market analysis request cannot be completed based on existing data accessible to the testing laboratory device;
   transmitting, based on the determination that the market analysis request cannot be completed, a marketing message to a client device associated with a customer based on the identifications in the request;
   receiving, by the testing laboratory device, cookie data of the client device associated with the customer, the cookie data comprising (i) a tracking number identifying a financial service account of the customer and (ii) online activity of the customer;
   determining the customer received the marketing message based on the received cookie data;
   determining, by the testing laboratory device, transaction data and a portion of the cookie data associated with an online purchase by the customer occurring in response to the marketing message, wherein:
      the transaction data (i) is received by the testing laboratory device from a database separate from the testing laboratory device and associated with the financial service account of the customer and (ii) indicates that the online purchase is within a predetermined time period of the customer receiving the marketing message,
      the cookie data indicates online activity that is related to the online purchase and is within the pre-determined time period of the customer receiving the marketing message, and
      the online purchase is an online purchase of the product from a second merchant and is associated with the financial service account of the customer;
   receiving financial data associated with financial transactions of the customer from the database;
   receiving demographic information associated with the customer, the demographic information comprising at least one of the customer's income, the customer's personal interests, the customer's current location, or the customer's marital status;
   determining, by the testing laboratory device, analysis results responsive to the received market analysis request, the determination being based on the transaction data, the portion of the cookie data, and at least one of the financial data or the demographic information, wherein the analysis results comprise a plurality of transaction data for purchases of different customers, the customers having similar financial data or demographic information;
   generating, by the testing laboratory device, a report indicating at least the determined analysis results; and
   providing, by the testing laboratory device, the report to the merchant device.

2. The method of claim 1, wherein determining the transaction data associated with the online purchase includes at least a determination that the online purchase was made within a specified time period for the product based on stock keeping unit (SKU) data.

3. The method of claim 1, wherein the online activity comprises an internet browsing history associated with the client device associated with the customer.

4. The method of claim 1, wherein the marketing message comprises at least one of a percentage discount offer, a monetary discount offer, or a bundling discount offer to buy the product from the first merchant.

5. The method of claim 1, wherein the marketing message comprises:
   a first marketing message offering, to the customer according to a first criteria via a plurality of marketing channels, a first discount for the product from the first merchant;
   a second marketing message offering, to the customer according to a second criteria via a plurality of marketing channels, a second discount for the product; and
   a third marketing message offering, to the customer according to a third criteria via a plurality of marketing channels, a third discount for the product.

6. The method of claim 5, wherein the analysis results identify which of the first marketing message, the second marketing message, or the third marketing message resulted in most purchases of the product.

7. A device, comprising:
   a memory storing software instructions, the software instructions including an application configured to perform marketing analysis processes, and
   one or more processors configured to execute the software instructions to:
      provide, from a testing laboratory device and to a merchant device associated with a first merchant, data to display at a display of the merchant device a graphical user interface comprising:
         a first area configured to receive a selection of a type of marketing channel and customizable message content, the customizable message content listing a product; and
         a second area configured to receive a selection of a type of marketing offer and a customer segment;
      receive, by the testing laboratory device, a market analysis request from the merchant device comprising identifications of a type of marketing channel, customizable message content, a type of marketing offer, and a customer segment, the identifications being based on at least one selection received by the first area and at least one selection received by the second area;

determine that the market analysis request cannot be completed based on existing data accessible to the testing laboratory device;

transmit, based on the determination that the market analysis request cannot be completed, a marketing message to a client device associated with a customer based on the identifications in the request;

receive, by the testing laboratory device, cookie data of the client device associated with the customer, the cookie data comprising (i) a tracking number identifying a financial service account of the customer and (ii) online activity of the customer;

determine the customer received the marketing message based on the received cookie data;

determine, by the testing laboratory device, transaction data and a portion of the cookie data associated with an online purchase by the customer occurring in response to the marketing message, wherein:

the transaction data (i) is received by the testing laboratory device from a database separate from the testing laboratory device and associated with the financial service account of the customer and (ii) indicates that the online purchase is within a pre-determined time period of the customer receiving the marketing message, the cookie data indicates online activity that is related to the online purchase and is within the pre-determined time period of the customer receiving the marketing message, and the online purchase is an online purchase of the product from a second merchant and is associated with the financial service account of the customer;

receive financial data associated with financial transactions of the customer from the database;

receive demographic information associated with the customer, the demographic information comprising at least one of the customer's income, the customer's personal interests, the customer's current location, or the customer's marital status;

determine, by the testing laboratory device, analysis results responsive to the received market analysis request, the determination being based on the transaction data, the portion of the cookie data, and at least one of the financial data or the demographic information, wherein the analysis results comprise a plurality of transaction data for purchases of different customers, the customers having similar financial data or demographic information;

generate, by the testing laboratory device a report indicating at least the determined analysis results; and provide, by the testing laboratory device, the report to the merchant device.

8. The device of claim 7, wherein determining the transaction data associated with the online purchase includes at least a determination that the online purchase was made within a specified time period for the product based on stock keeping unit (SKU) data.

9. The device of claim 7, wherein the online activity comprises an internet browsing history associated with the client device associated with the customer.

10. The device of claim 7, wherein the marketing message comprises at least one of a percentage discount offer, a monetary discount offer, or a bundling discount offer to buy the product from the first merchant.

11. The device of claim 7, wherein the marketing message comprises:

a first marketing message offering, to the customer according to a first criteria via a plurality of marketing channels, a first discount for the product from the first merchant;

a second marketing message offering, to the customer according to a second criteria via a plurality of marketing channels, a second discount for the product; and a third marketing message offering, to the customer according to a third criteria via a plurality of marketing channels, a third discount for the product.

12. The device of claim 11, wherein the analysis results identify which of the first marketing message, the second marketing message, or the third marketing message resulted in most purchases of the product.

13. A non-transitory computer readable medium storing software instructions that, when executed by one or more processors, configures the one or more processors to:

provide, from a testing laboratory device and to a merchant device associated with a first merchant, data to display at a display of the merchant device a graphical user interface comprising:

a first area configured to receive a selection of a type of marketing channel and customizable message content, the customizable message content listing a product; and a second area configured to receive a selection of a type of marketing offer and a customer segment;

receive, by the testing laboratory device, a market analysis request from the merchant device comprising identifications of a type of marketing channel, customizable message content, a type of marketing offer, and a customer segment, the identifications being based on at least one selection received by the first area and at least one selection received by the second area;

determine that the market analysis request cannot be completed based on existing data accessible to the testing laboratory device;

transmit, based on the determination that the market analysis request cannot be completed, a marketing message to a client device associated with a customer based on the identifications in the request;

receive, by the testing laboratory device, cookie data of the client device associated with the customer, the cookie data comprising (i) a tracking number identifying a financial service account of the customer and (ii) online activity of the customer;

determine the customer received the marketing message based on the received cookie data;

determine, by the testing laboratory device, transaction data and a portion of the cookie data associated with an online purchase by the customer occurring in response to the marketing message, wherein:

the transaction data (i) is received by the testing laboratory device from a database separate from the testing laboratory device and associated with the financial service account of the customer and (ii) indicates that the online purchase is within a pre-determined time period of the customer receiving the marketing message, the cookie data indicates online activity that is related to the online purchase and is within the pre-determined time period of the customer receiving the marketing message, and the online purchase is an online purchase of the product from a second merchant and is associated with the financial service account of the customer;

receive financial data associated with financial transactions of the customer from the database;

receive demographic information associated with the customer, the demographic information comprising at least one of the customer's income, the customer's personal interests, the customer's current location, or the customer's marital status;

determine, by the testing laboratory device, analysis results responsive to the received market analysis request, the determination being based on the transaction data, the portion of the cookie data, and at least one of the financial data or the demographic information, wherein the analysis results comprise a plurality of transaction data for purchases of different customers, the customers having similar financial data or demographic information;

generate, by the testing laboratory device, a report indicating at least the determined analysis results; and provide, by the testing laboratory device, the report to the merchant device.

14. The medium of claim 13, wherein determining the transaction data associated with the online purchase includes at least a determination that the online purchase was made within a specified time period for the product based on stock keeping unit (SKU) data.

15. The medium of claim 13, wherein the online activity comprises an internet browsing history associated with the client device associated with the customer.

16. The medium of claim 13, wherein the marketing message comprises:
 a first marketing message offering, to the customer according to a first criteria via a plurality of marketing channels, a first discount for the product from the first merchant;
 a second marketing message offering, to the customer according to a second criteria via a plurality of marketing channels, a second discount for the product; and
 a third marketing message offering, to the customer according to a third criteria via a plurality of marketing channels, a third discount for the product.

17. The medium of claim 16, wherein the analysis results identify which of the first marketing message, the second marketing message, or the third marketing message resulted in most purchases of the product.

18. The method of claim 1, wherein determining the transaction data associated with the online purchase includes at least a determination that a purchase link associated with the marketing message was clicked within a specified period of time.

19. The device of claim 7, wherein determining the transaction data associated with the online purchase includes at least a determination that a purchase link associated with the marketing message was clicked within a specified period of time.

20. The medium of claim 13, wherein determining the transaction data associated with the online purchase includes at least a determination that a purchase link associated with the marketing message was clicked within a specified period of time.

* * * * *